United States Patent
Lai

(10) Patent No.: US 7,275,944 B1
(45) Date of Patent: Oct. 2, 2007

(54) CARD CONNECTOR CAPABLE OF DETECTING INSERTION OF CARD

(75) Inventor: Yaw-Huey Lai, Taipei County (TW)

(73) Assignee: Tai-Sol Electronics Co., Ltd. (TW)

( * ) Notice: Subject to any disclaimer, the term of this patent is extended or adjusted under 35 U.S.C. 154(b) by 0 days.

(21) Appl. No.: 11/500,291

(22) Filed: Aug. 8, 2006

(30) Foreign Application Priority Data

Apr. 28, 2006 (TW) .............................. 95207334 U

(51) Int. Cl.
*H01R 13/62* (2006.01)
(52) U.S. Cl. ..................................... 439/159
(58) Field of Classification Search ................ 439/159, 439/188, 489
See application file for complete search history.

(56) References Cited

U.S. PATENT DOCUMENTS

| 6,394,827 B2 * | 5/2002 | Nogami ..................... 439/159 |
| 6,652,300 B2 * | 11/2003 | Nishioka .................... 439/159 |
| 6,699,053 B2 | 3/2004 | Kuroda |
| 6,767,232 B1 * | 7/2004 | Tien ........................... 439/159 |
| 6,776,640 B2 * | 8/2004 | Nishioka .................... 439/325 |
| 6,814,596 B2 * | 11/2004 | Yu et al. ..................... 439/159 |
| 6,840,786 B2 * | 1/2005 | Sato et al. .................. 439/159 |
| 6,878,003 B2 * | 4/2005 | Natori ........................ 439/159 |
| 6,929,490 B2 * | 8/2005 | Kodera et al. ............. 439/159 |
| 6,951,471 B1 * | 10/2005 | Chen .......................... 439/159 |

FOREIGN PATENT DOCUMENTS

TW    M267600    6/2005

* cited by examiner

*Primary Examiner*—Tulsidas C. Patel
*Assistant Examiner*—Harshad C Patel
(74) *Attorney, Agent, or Firm*—Bacon & Thomas PLLC

(57) ABSTRACT

A card connector capable of detecting insertion of a card includes a housing; a plurality of terminals mounted to the housing; a contact portion formed in the housing; a tongue located in the housing and having an end mounted to the housing and the other end thereof provided with an action portion close to and spaced from the contact portion for a predetermined interval; and an injecting/ejecting mechanism slidably mounted in the housing and having a bevel facing the contact portion. In light of this, while the injecting/ejecting mechanism is slidably moved into the card connector, the bevel works on the action portion of the tongue to push the tongue for contact with the contact portion, thus effecting detection of insertion of a card.

9 Claims, 9 Drawing Sheets

CARD CONNECTOR CAPABLE OF DETECTING INSERTION OF CARD

BACKGROUND OF THE INVENTION

1. Field of the Invention

The present invention relates generally to card connectors, and more particularly, to a card connector capable of detecting insertion of a card.

2. Description of the Related Art

A conventional card connector includes two tongues mounted at one side thereof and spaced from each other for a predetermined interval for detecting whether a card is inserted into the card connector or not. While inserted into the card connector, the card works on and pushes one of the tongues to deform the tongue sideward and to further enable the tongue to contact the other, thus effecting short circuit for detecting the insertion of the card. For example, Taiwan Patent No. M267600 disclosed an all-in-one card connector having numerous groups of the tongues for detecting the insertion of multiple kinds of cards.

The above-mentioned card connector has a drawback in need of improvement. Because each of the tongues is mounted inside the card connector, an additional terminal or wire has to be mounted in the card connector to extend out of the card connector for external connection.

In addition, U.S. Pat. No. 6,699,053 disclosed a conventional injecting/ejecting mechanism composed of a lock pin 5, a return spring 4, and a slide member 6 having a heart-shaped cam groove 6d, for injecting and ejecting a card.

SUMMARY OF THE INVENTION

The primary objective of the present invention is to provide a card connector capable of detecting insertion of a card, which structure is simpler than the conventional one.

The secondary objective of the present invention is to provide a card connector capable of detecting insertion of a card, which connection and assembly are easier than those of the conventional one.

The foregoing objectives of the present invention are attained by the card connector composed of a housing, a plurality of terminals, a contact portion, a tongue, and an injecting/ejecting mechanism. The housing includes an opening formed at a front end of the terminals, at least one receiving space formed therein, and a slide track formed therein and located at one side of the receiving space. The terminals are mounted to the housing, each having one end extending into the receiving space. The contact portion is mounted at one side of the housing. The tongue is located in the housing, having an end mounted to the housing and the other end thereof provided with an action portion close to and spaced from the contact portion for a predetermined interval. The injecting/ejecting mechanism includes a bevel facing the contact portion. In light of this, while the injecting/ejecting mechanism is slidably moved toward inside of the card connector, the bevel works on the action portion of the tongue to push the tongue for contact with the contact portion, thus effecting detection of insertion of a card.

DETAILED DESCRIPTION OF PREFERRED EMBODIMENTS

Figure 1:
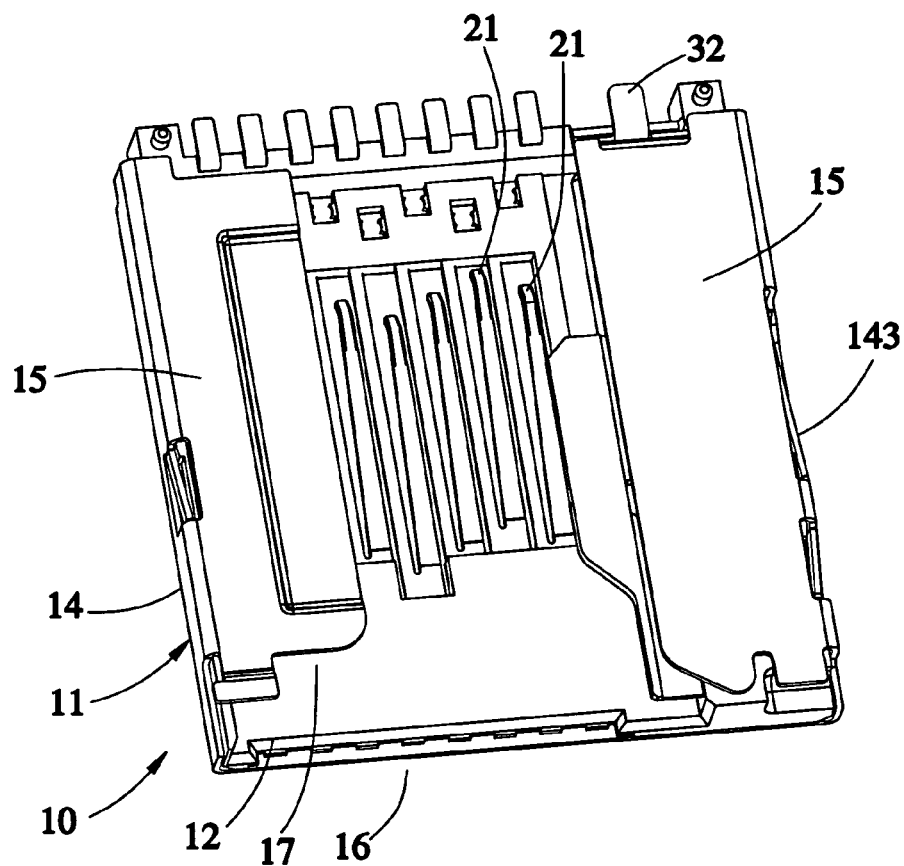
FIG. 1 is a top perspective view of a preferred embodiment of the present invention.
Figure 2:
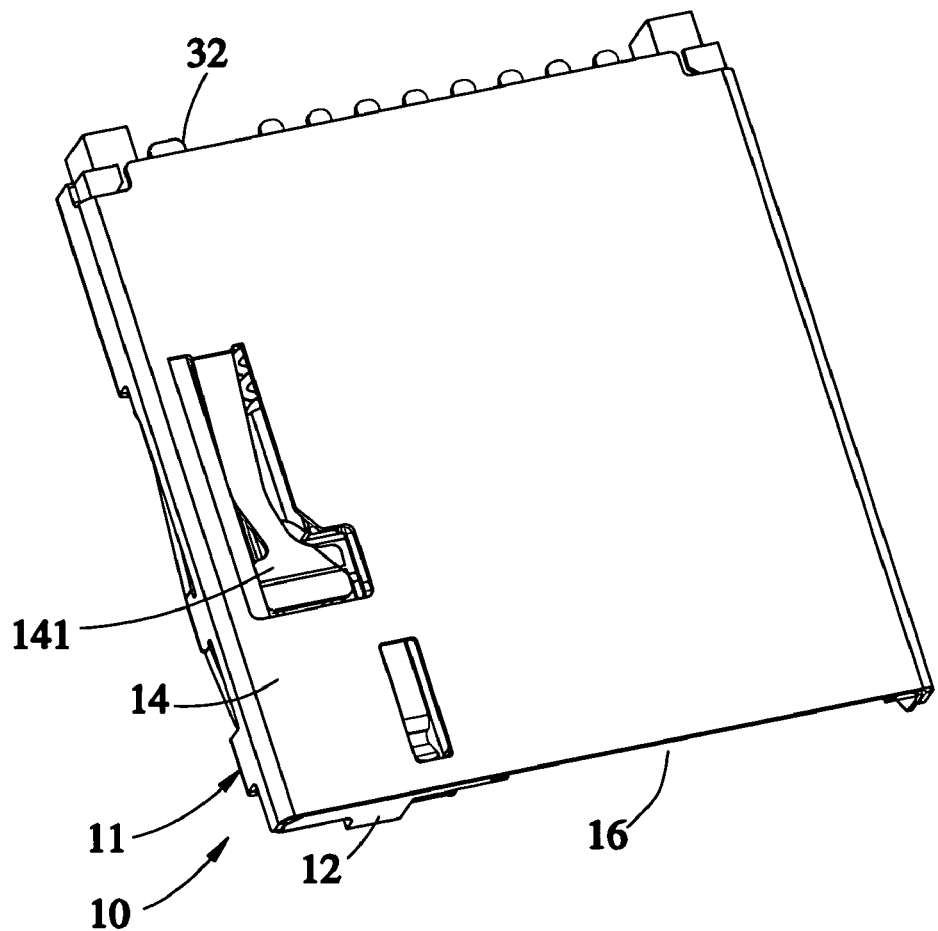
FIG. 2 is a bottom perspective view of the preferred embodiment of the present invention.
Figure 3:
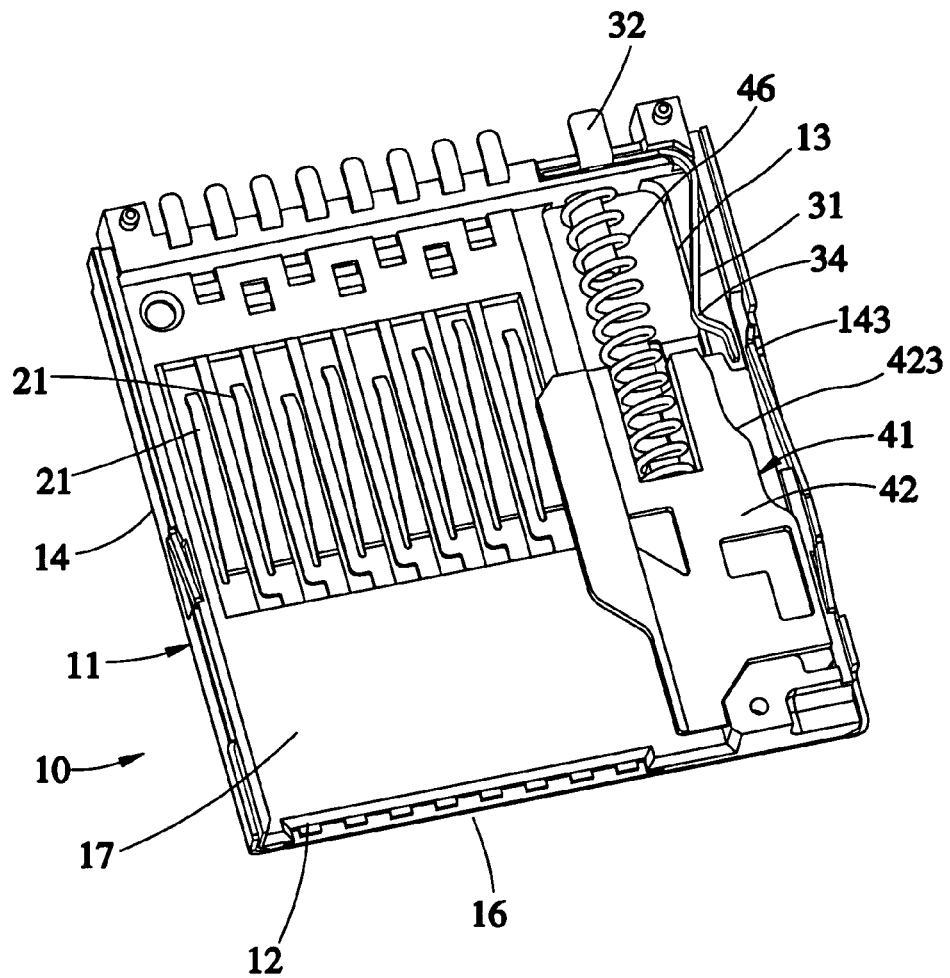
FIG. 3 is a top perspective view of the preferred embodiment of the present invention, which cover shell is partially removed.
Figure 4:
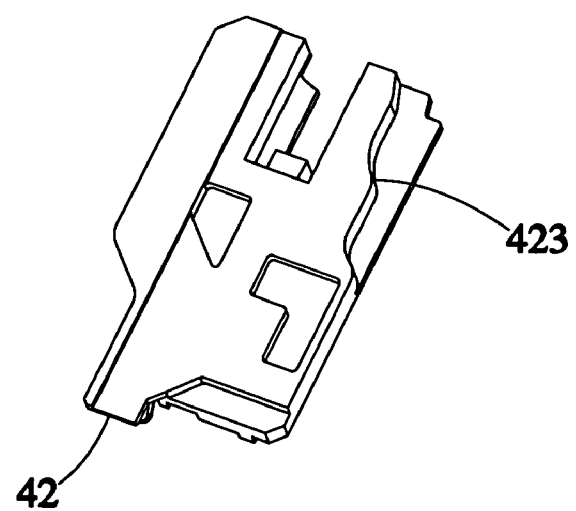
FIG. 4 is a top perspective view of the slide member of the preferred embodiment of the present invention.
Figure 5:
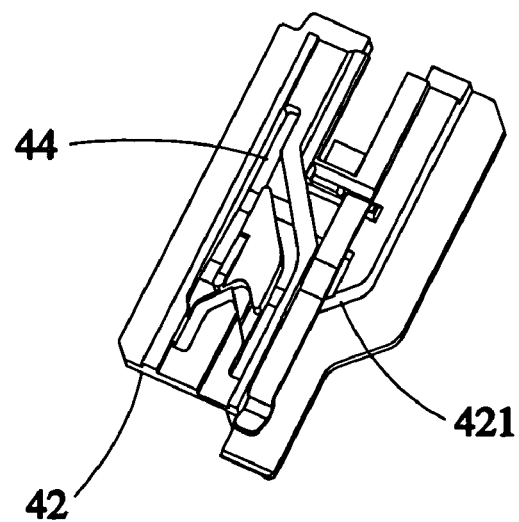
FIG. 5 is a bottom perspective view of the slide member of the preferred embodiment of the present invention.

Referring to FIGS. 1-6, a card connector 10 capable of detecting insertion of a card, constructed according to a preferred embodiment of the present invention, is composed of a housing 11, a plurality of terminals 21, a contact portion 143, a tongue 31, and an injecting/ejecting mechanism 41.

The housing 11 is composed of a base frame 12 and a cover shell 14 partially covering the base frame 12. Substantially, the cover shell 14 is made of a metallic material, covering a bottom side and two lateral sides of the base frame 12. The cover shell 14 has two extended pieces 15 extending toward each other from two lateral sides of a top side thereof and partially covering two parts of the top side thereof, thus holding the base frame 12. The base frame 12 and the cover shell 14 have an opening 16 formed at a front end therebetween and a receiving space 17 formed therein for receiving a card 99 inserted from outside. While the card 99 is inserted, the two extended pieces 15 can limit the position of the card 99. The base frame 12 further includes a slide track 13 located at one side of the receiving space 17. The cover shell 14 further includes a pressing piece 141 formed in one piece therewith.

The terminals 21 are mounted to the base frame 12, each of which has one end extending into the receiving space 17.

The contact portion 143 is formed in one piece with the cover shell, extending outward from the cover shell 14 and located at one side the cover shell 14.

The tongue 31 includes a rear end mounted to a rear side of the base frame 12 and defining a connection end 32 exposed outside the base frame 12, having a front end thereof defining an action portion 34 close to and spaced from the contact portion 143 for a predetermined interval.

Figure 6:
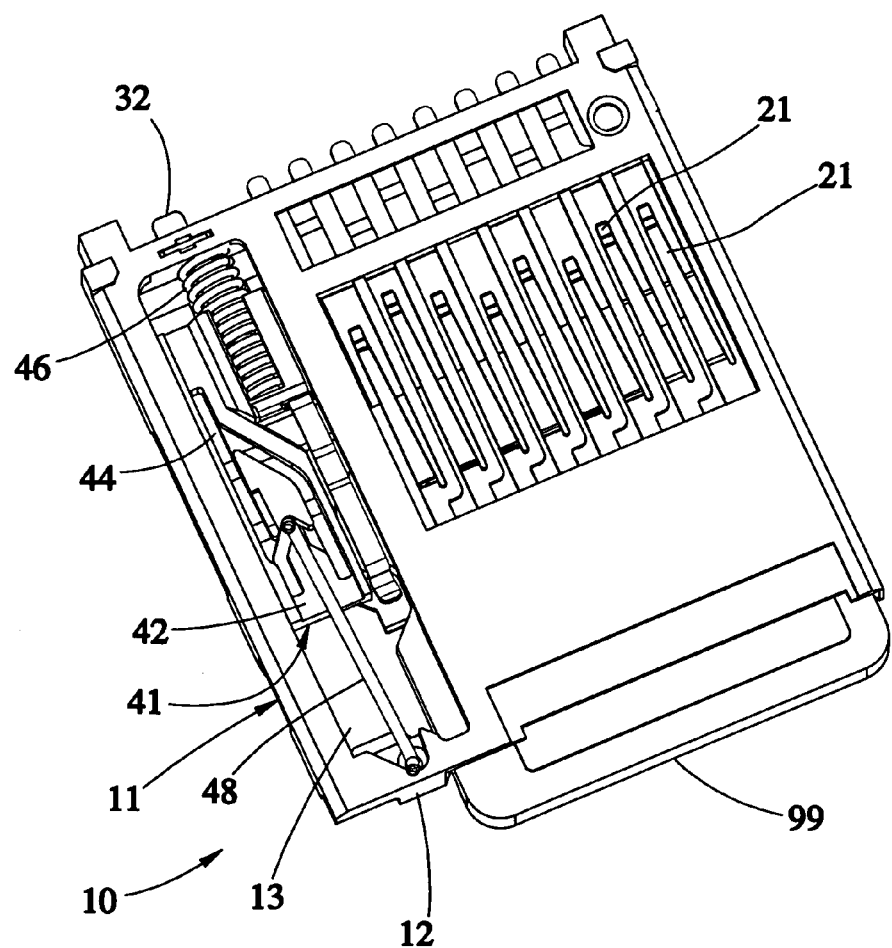
FIG. 6 is a bottom perspective view of the preferred embodiment of the present invention which cover shell is removed, illustrating the correlative position between the slide member and the guide bar after a card is inserted.

The injecting/ejecting mechanism 41 includes a slide member 42 slidably mounted to the slide track 13, a heart-shaped groove 44 formed on the slide member 42, a spring 46 mounted between the slide member 42 and the base frame 12, and a guide bar 48 mounted to the base frame 12 and the heart-shaped groove 44. The slide member 42 has an action point 421 facing the receiving space 17 for working on the card 99 inserted from outside to enable the slide member 42 to correspondingly inject/eject the card 99, while the card 99 is inserted into the card connector 10. The slide member 42 has a bevel 423 facing the contact portion 143. The pressing piece 141 of the cover shell 14 is provided for pressing the guide bar 48. It is to be noted that FIG. 6 shows the card connector 10 which cover shell is removed and the guide bar is shown.

Figure 7:
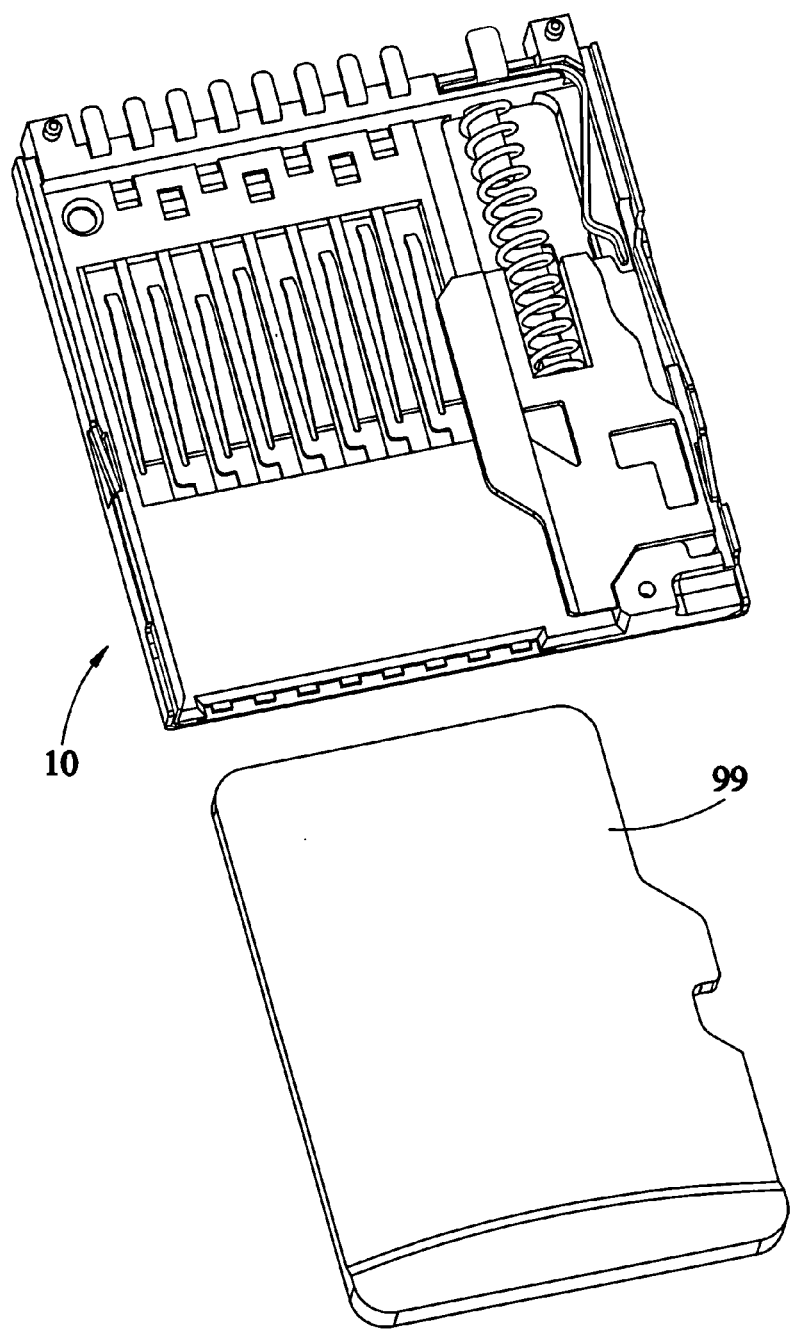
FIG. 7 is a schematic view of the embodiment of the present invention at work, illustrating that a card is not inserted into the card connector.
Figure 8:
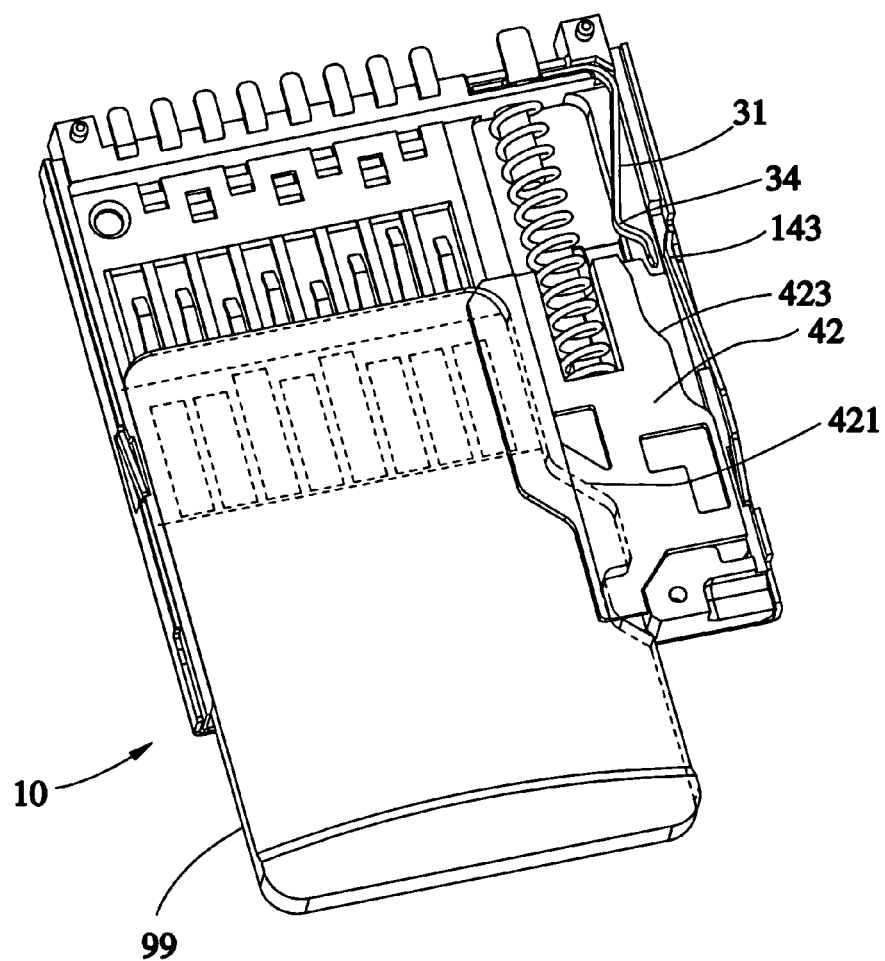
FIG. 8 is a schematic view of the embodiment of the present invention at work, illustrating that the card is being inserted into the card connector.
Figure 9:
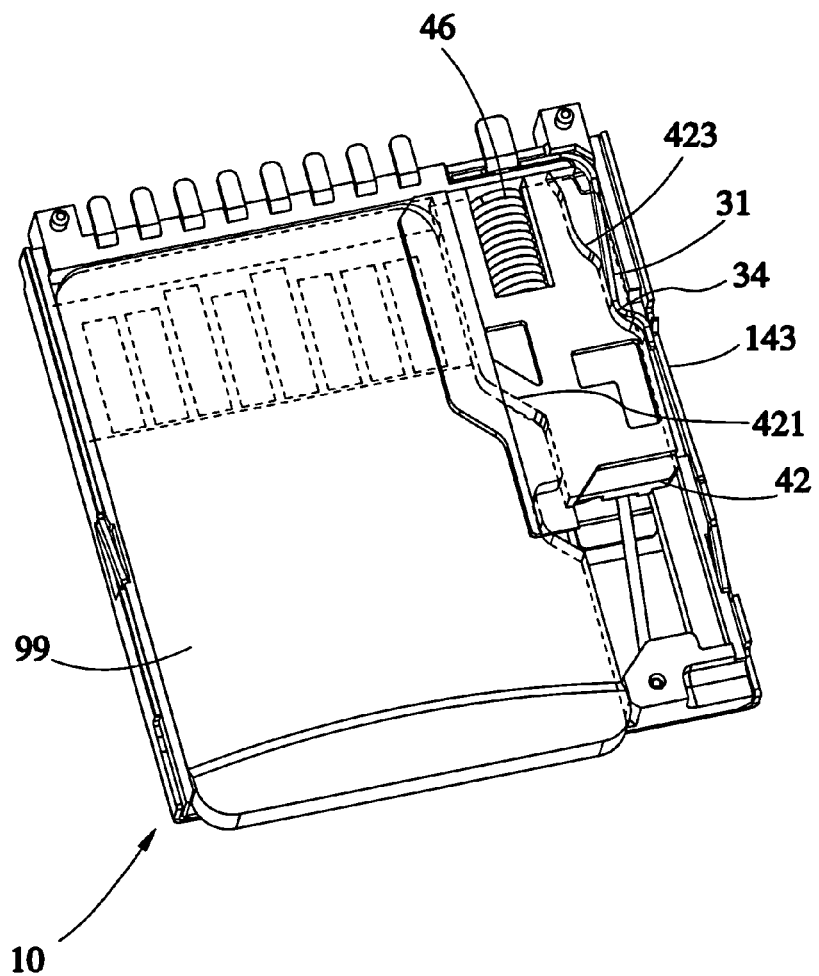
FIG. 9 is a schematic view of the embodiment of the present invention at work, illustrating that a card is inserted into the innermost of the card connector.
Figure 10:
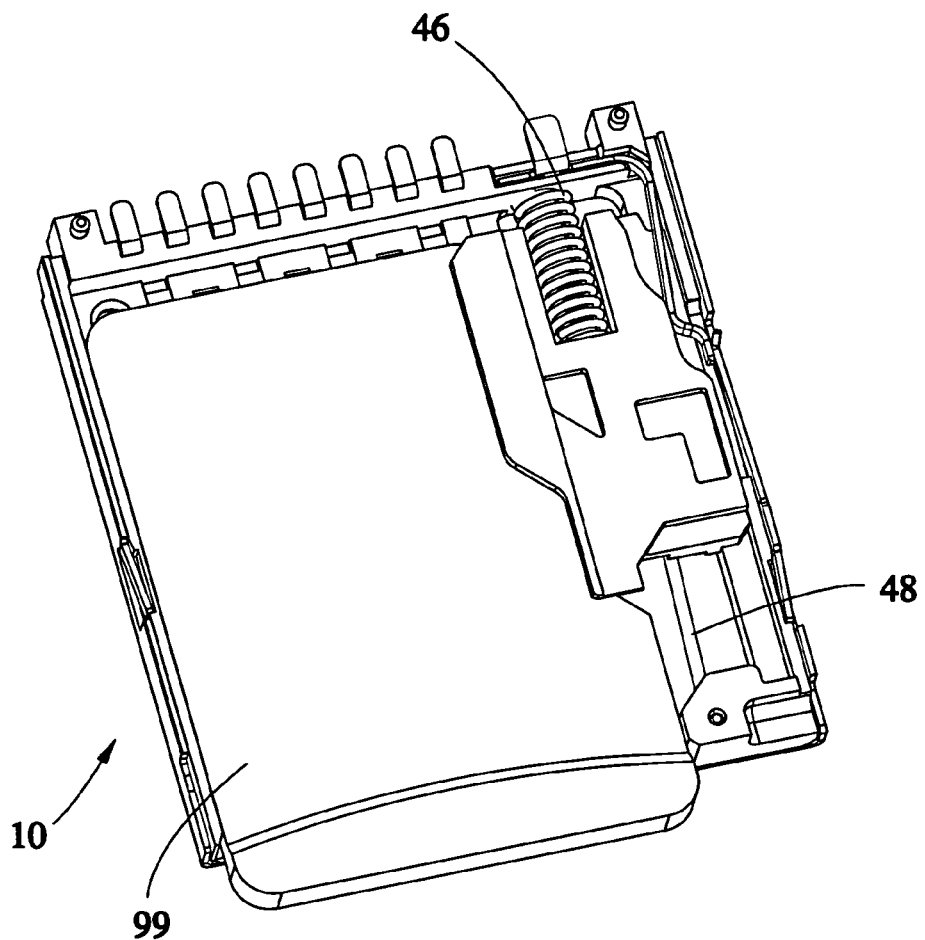
FIG. 10 is a schematic view of the embodiment of the present invention at work, illustrating that the card is located at an insertion position.

FIG. 7 illustrates that the card 99 is not inserted into the card connector 10 of the present invention. Referring to FIGS. 8 and 9, while inserted into the card connector, the card 99 works on the action point 421 of the slide member 42 to together push the slide member 42 toward the inside of the card connector 10. During the course of the slide member 42 entering the inside of the card connector 10, the bevel 423 works on the action portion 34 of the tongue 31 to push the tongue 31 outward, and then the front end of the tongue 31 contacts the contact portion 143 to enable short circuit, such that the insertion of the card 99 can be detected. FIG. 9 illustrates that the card 99 is inserted into the innermost of the card connector 10. Because the resilience is generated while the spring 46 is deformed and the guide bar 48 works on the heart-shaped groove 46 to be held in an insertion position, the card 99 keeps inserted as shown in FIG. 10. The interrelationship between the guide bar 48 and the heart-shaped groove 44 of the injecting/ejecting mechanism 41 belongs to the prior art, such that no more description is necessary.

While intending to eject the card 99, the user can push the card 99 once more to drive the slide member 42 to move, the guide bar 48 gets rid of the lockup, the slide member 42 is moved outward by the resilience of the spring 46 to an ejecting position, and then the card 99 is pushed outward at the same time. Meanwhile, the bevel 423 stops working on the action portion 34 of the tongue 31 and then the tongue 31 returns to the original position to stop contact with the contact portion 143. Thus, the short circuit is disengaged.

The tongue 31 having the connection end 32 exposed outside the base frame 12 can be in contact with the contact portion 143 of the cover shell 14 for short circuit or open circuit, such that the cover shell 14 and the connection end 32 can be treated as two electrodes for detection which can be done by an external detection circuit (not shown) in connection with the cover shell 14 and the connection end 32.

In addition, the bevel 423 of the slide member 42 and the action portion 34 of the tongue 31 are interchangeable with each other as equivalent. In other words, the bevel of the slide member can be changed to the action portion and the action portion of the tongue can be changed to the bevel; while they are interacted, the same effect of pushing/ejecting can be achieved.

In conclusion, the present invention includes the following advantages.

1. Simplified Structure

Compared with the prior art, the two electrodes of the present invention provided for detection are the connection end 32 and the cover shell 14 respectively such that neither any terminal should be mounted nor any wire should be connected. In other words, the present invention is structurally more simplified than the prior art.

2. Easier Connection and Assembly

Because none of any additional terminal or wire is required, the present invention has less components to be easier than the prior art in assembly. Besides, the cover shell and the connection end exposed outside the base frame can be acted as two electrodes for detection such that the present invention is easier than the prior art in connection.

Although the present invention has been described with respect to a specific preferred embodiment thereof, it is no way limited to the details of the illustrated structures but changes and modifications may be made within the scope of the appended claims.

What is claimed is:

1. A card connector capable of detecting insertion of a card, comprising:
   a housing having an opening formed at a front end thereof, at least one receiving space formed therein for receiving a card inserted from outside, and a slide track formed therein and located at a side of said receiving space;
   a plurality of terminals mounted to said housing and each having an end extending into said receiving space;
   a contact portion located at a side of said housing;
   a tongue located in said housing and having two ends mounted to said housing and defining an action portion respectively, said action portion being close to and spaced from said contact portion; and
   an injecting/ejecting mechanism slidably mounted to said slide track and having an action point facing said receiving space for working on the card inserted from outside and correspondingly injecting/ejecting the card, said injecting/ejecting mechanism having a bevel facing said contact portion;
   wherein said bevel works on said action portion to push said tongue to contact said portion for detection of an inserted card while said injecting/ejecting mechanism is slidably moved into said card connector.

2. The card connector as defined in claim 1, wherein said housing comprises a base frame and a cover shell, said cover shell at least covering a part of said base frame.

3. The card connector as defined in claim 2, wherein said contact portion is formed on said cover shell.

4. The card connector as defined in claim 2, wherein said cover shell is made of a metallic material.

5. The card connector as defined in claim 4, wherein said contact portion extends outward from said cover shell to be formed in one piece with said cover shell; said tongue comprises an end mounted to a rear side of said base frame and exposed outside said base frame to be a connection end; said action portion is formed at the other end of said tongue.

6. The card connector as defined in claim 2, wherein said cover shell covers a bottom side and two lateral sides of said base frame and further comprises two extended pieces extending toward each other from a top side thereof, said two extended pieces covering two parts of the top side of said base frame.

7. The card connector as defined in claim 2, wherein said injecting/ejecting mechanism further comprises a slide member, a heart-shaped groove formed on said slide member, a spring mounted between said slide member and said base frame, and a guide bar mounted on said base frame and said heart-shaped groove.

8. The card connector as defined in claim 7, wherein said action point and said bevel are formed on said slide member.

9. The card connector as defined in claim 7, wherein said cover shell further comprises a pressing piece formed in one piece therewith for pressing said guide bar.

* * * * *